US007676677B2

(12) United States Patent
Chen et al.

(10) Patent No.: US 7,676,677 B2
(45) Date of Patent: Mar. 9, 2010

(54) DIGITAL SIGNATURE METHOD AND APPARATUS

(75) Inventors: Liqun Chen, Bradley Stoke Bristol (GB); Caroline Kudla, Montague Hill South Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1301 days.

(21) Appl. No.: 10/957,014

(22) Filed: Sep. 30, 2004

(65) Prior Publication Data
US 2005/0076223 A1 Apr. 7, 2005

(30) Foreign Application Priority Data
Oct. 1, 2003 (GB) .................................. 0322965.5
Oct. 14, 2003 (GB) .................................. 0323984.5

(51) Int. Cl.
*H04L 9/32* (2006.01)
(52) U.S. Cl. ...................... 713/176; 713/155; 713/170; 380/286; 705/1
(58) Field of Classification Search ................. 713/155, 713/170, 176; 380/286; 705/1
See application file for complete search history.

(56) References Cited
U.S. PATENT DOCUMENTS 5,666,420 A * 9/1997 Micali .......................... 380/30
5,987,131 A * 11/1999 Clapp .......................... 713/171
6,483,921 B1 * 11/2002 Harkins ....................... 380/286
6,647,493 B1 * 11/2003 Occhipinti et al. ........... 713/170
6,724,893 B1 * 4/2004 Petro .......................... 380/286
6,728,378 B2 * 4/2004 Garib .......................... 380/259
7,120,609 B1 * 10/2006 Kerkdijk ....................... 705/78
2002/0049601 A1 * 4/2002 Asokan et al. ................. 705/1
2002/0106085 A1 * 8/2002 Jain et al. .................... 380/277
2002/0164026 A1 * 11/2002 Huima ........................ 380/247

(Continued)

FOREIGN PATENT DOCUMENTS
EP    955 745 A2    11/1999

(Continued)

OTHER PUBLICATIONS

Asokan et al. Optimistic Fair Exchange of Digital Signatures. IEEE: 4, Apr. 2000. http://ieeexplore.ieee.org/iel5/49/18160/00839935.pdf?arnumber=839935.*

(Continued)

*Primary Examiner*—Michael J Simitoski
*Assistant Examiner*—Kari L Schmidt (57) ABSTRACT

A digital signature method and apparatus is provided in which a first party with a first public/private key pair forms an ambiguous signature on subject data using at least the private key of the first key pair, a keystone initially only known to the first party, and the public key of at least one other public/private key-pair. This signature is ambiguous in that a signature-checking party can only verify that the signature is in the set comprising a signature created by the first party and a respective signature created by the possessor of the private key of the or each of the key pairs the public key of which was used in creating the signature. Revelation of the keystone renders the signature unambiguous. Such an ambiguous signature can be used to implement a fair exchange of signatures between any number of parties, with the exchanged signatures being ambiguous signatures until revelation of the initial signer's keystone.

39 Claims, 4 Drawing Sheets

U.S. PATENT DOCUMENTS

| | | | |
|---|---|---|---|
| 2003/0120611 A1* | 6/2003 | Yoshino et al. | 705/67 |
| 2003/0177361 A1* | 9/2003 | Wheeler et al. | 713/176 |
| 2004/0073790 A1* | 4/2004 | Ateniese et al. | 713/165 |

FOREIGN PATENT DOCUMENTS

| | | |
|---|---|---|
| WO | 99/48243 | 9/1999 |
| WO | 02/07376 | 1/2002 |

OTHER PUBLICATIONS

Wong et al. "Secure Group Communications Using Key Graphs." SIGCOMM (1998). http://delivery.acm.org/10.1145/290000/285260/p68-wong.pdf?key1=285260&key2=2303952521&coll=ACM&dI=ACM&CFID=49937096&CFTOKEN=47926014.*

Wong et al. Secure Group Communications Using Key Graphs. IEEE/ACM Transactions on networking, vol. 8, No. 1: Feb. 1, 2000.*

Wang et al. "The Fairness Of Perfect Concurrent Signatures". Institute for Inforcomm Research: Mar. 7, 2006.*

Wong et al. "Keystone: A Group Key Management Service". Proceedings International COnference n Telecomunications. Mexico: May 2000.*

Huang et al. "Perfect Concurrent Signature Protocol". 8$^{th}$ ACIS International Conference on Software Engineering, Artificial Intelligence, Networking and Parallel/Distributed Computing. IEEE: 2007.*

Wang et al. "A New Concurrent Signature Scheme Based on the FAPKC3's Signature Scheme". Aug. 2008.*

Yunfeng et al. "Accountability of Perfect Concurrent Signature". International Conference on Computer and Electrical Engineering: 2008.*

Chen et al. "Concurrent SIgnatures". EUROCRYPT: 2004. http://www.iacr.org/conferences/eurocrypt2004/slides/session9talk2.pdf.*

Chen et al. "Concurrent Signatures" Information Security Group. London: Aug. 23-25, 2004. http://www.informatik.uni-trier.de/~ley/db/conf/wisa/wisa2004.html.*

Kudla, Caroline. "Special Signature Schemes and Key Agreement Protocols". University of London: Oct. 2006.*

Fan et al. "An Enhanced-security Fair E-payment Protocol". IEEE: 2008.*

Huang et al. "Analysis and Improvements of Two Identity-Based Perfect Concurrent Signatures Scheme". Informatica: 2007, vol. 18, No. 3, pp. 375-394.*

Xu et al. "A Ring Signature Scheme Using Bilinear Pairings." WISA: 2004. pp. 160-170.*

Fan et al. "Two Fair Payment Protocols for E-Commerce Transaction." International Gederation for Information Processing,: 2007.*

Cachin, Christian."Advances in Cryptology-EUROCRYPT 2004". Springer-Verlag. Berlin: 2004. http://books.google.com/books?id=XL20VIoTu3EC&pg=PA294&lpg=PA294&dq=keystone+and+%22ambiguous+signature%22&source=bl&ots=Bdii__hkYto&sig=ae__UnixwCH0LCmiako4dWkYKO6w&hI=en&ei=F8aeSvfEDZCx8QbBt__C4Aw&sa=X&oi=book__result&ct=result&resnum=9#v=onepage&q=keystone%20a.*

Chen, L., et al., "Concurrent Signatures," *Eurocrypt 2004*, Lecture Notes on Computer Science, vol. 3027, 18 pages total (May 2, 2004).

M. Abe, M. Ohkubo and K. Suzuki, "1-out-of-n Signatures from a Variety of Keys," in Cryptology—Asiacrypt 2002, LNCS 2501, pp. 415-432, Springer 2002.

N. Asokan, Victor Shoup, Michael Waidner, "Optimistic Fair Exchange of Digital Signatures," IBM Zurich Research laboratory, Switzerland (pp. 1-20) Nov. 17, 1997.

Y. Dodis, and L. Reyzin, "Breaking and Repairing Optimistric Fair Exchange from PODC 2003," In ACM Workshop on Digital Rights Management (DDRM), Sep. 2, 2003.

J. Garay and C. Pomerance, "Timed Fair Exchange of Standard Signatures," in Proceedings Financial Crypto, Jan. 2003.

O. Goldreich, "A Simple Protocol For Signing Contracts," Computer Science Department, Israel Springer-Verlag: 1998.

M. Jakobsson, K. Sako, and R. Impagliazzo, "Designated Verifier Proofs And Their Applications," in Lecture Notes in Computer Science 1996, vol. 1070.

J. Park, E. Chong, and H. Siegel, "Constructing Fair-Exchange Protocols for E-commerce Via Distributed Computation of RSA Signatures," ACM: Jul. 2003.

R.L. Rivest, A. Shamir, and Y. Tauman, "How To Leak A Secret," in Advances in Cryptology—Asiacrypt 2001, LNCS 2248, pp. 552-565, Springer 2001.

C. P. Schnorr, "Efficient Signature Generation by Smart Cards," in Journal of Cryptology 4(3):161-174, Mar. 1991.

Boneh, D., et al., "Aggregate and Verifiably Encrypted Signatures from Bilinear Maps," *Advances in Cryptology-Eurocrypt, International Association for Cryptologic Research*, pp. 416-432 (May 4, 2003).

Chen, L., "Efficient Fair Exchange with Verifiable Conformation of Signatures," *Asiacrypt, International Conference on the Theory and Application of Cryptology and Information Security*, pp. 286-299 (Oct. 22, 1998).

* cited by examiner

| | A | B | C | D |
|---|---|---|---|---|
| $y_A$ | $w_A$ | $f_{A1} \oplus f_{A2}$ | $f_{A3} \oplus f_{B1}$ | $f_{C1}$ |
| $y_B$ | $f_{A1} = H_1(k_A \| 1)$ | $w_B$ | $f_{A1} \oplus f_{A2}$ | $f_{A3} \oplus f_{B1}$ |
| $y_C$ | $f_{A2} = H_1(k_A \| 2)$ | $f_{A3}$ | $w_C$ | $f_{A1} \oplus f_{A2}$ |
| $y_D$ | $f_{A3} = H_1(k_A \| 3)$ | $f_{B1} = H_1(k_B \| 1)$ | $f_{C1} = H_1(k_C \| 1)$ | $w_D$ |

Figure 3

| | A | B | C | D |
|---|---|---|---|---|
| $y_A$ | $w_A$ | $f_{A1} \oplus f_{A2} \oplus f_{A3}$ | $f_{B1} \oplus f_{B2}$ | $f_{C1}$ |
| $y_B$ | $f_{A1} = H_1(k_A \| 1)$ | $w_B$ | $f_{A1} \oplus f_{A2} \oplus f_{A3}$ | $f_{B1} \oplus f_{B2}$ |
| $y_C$ | $f_{A2} = H_1(k_A \| 2)$ | $f_{B1} = H_1(k_B \| 1)$ | $w_C$ | $f_{A1} \oplus f_{A2} \oplus f_{A3}$ |
| $y_D$ | $f_{A3} = H_1(k_A \| 3)$ | $f_{B2} = H_1(k_B \| 2)$ | $f_{C1} = H_1(k_C \| 1)$ | $w_D$ |

Figure 4

DIGITAL SIGNATURE METHOD AND APPARATUS

FIELD OF THE INVENTION

The present invention relates to a digital signature method and apparatus and in particular, but not exclusively, to the fair exchange of digital signatures.

BACKGROUND OF THE INVENTION

It is well known to use a digital signature to provide a non-repudiable indication of the originator of a document (or other data) covered by the signature. Typically, the signature creation and verification processes involve a public/private key pair of the signer, the private key being used in creating the signature and the corresponding public key in the verification process.

An example digital signature is the Schnorr signature as described in the paper: "Efficient signature generation by smart cards" C. Schnorr., in Journal of Cryptology, 4(3):161-174, 1991. According to this signature scheme, there are two large primes p and q selected such that q|p−1, which are published with an element g of $(Z/pZ)^*$ of order q. A signer with private key x and public key $g^x$ mod p signs a message M as follows:

The signer chooses a random number $t \in Z^*_q$;
The signer computes:

$$h = \text{Hash}(g^t \bmod p \| M)$$

$$s = t - xh \bmod q$$

where $\|$ represents concatenation

The signer outputs (s, h) as its signature on message M

Verification that the signature is from the sender and is on message M is effected by a verifier (who knows the signer's public key $g^x$ mod p) by seeking to generate a value h' that should match the value of h in the signature. The verifier does this as follows:

The verifier first computes:

$$(g^t)' = g^s (g^x)^h \bmod p$$

where s and h are the received signature values (it being appreciated that if the values are correct, the right-hand expression is equivalent to $g^t$ mod p)

The verifies then computes:

$$h' = \text{Hash}((g^t)' \bmod p \| M)$$

where M is the received message

The verifier then compares h' and h which, if equal proves that the message M was signed by the party having the public key $g^x$ mod p.

Electronic transactions frequently involve the exchange of signatures on data representing commitments of the parties concerned. There is, however, an inherent problem of fairness in the sense that one party will be the first to provide their signature and this can be abused by the second party to the transaction. Thus, for example, the second party, being in possession of the first party's signature on some commitment, can represent to an independent party that the transaction has been completed by the second party having made a complimentary commitment to the first party when, in reality, this has not been done.

The problem of fair commitment or fair exchange of signatures is a fundamental problem in secure electronic transactions, especially where the parties involved are mutually distrustful. Up to now, there have been two different approaches to solving the problem of exchanging signatures so that it is fair for both parties.

The first method involves the use of a (semi-trusted) arbitrator (Trent) who can be called upon to handle disputes between signers. The idea is that Alice registers her public key with Trent in a one-time registration, and thereafter may perform many fair exchanges with various other entities. Trent may possibly learn some part of Alice's secret at this stage. To take part in a fair exchange with Bob, Alice creates a partial signature which she sends to Bob. Bob can be convinced that the partial signature is valid (perhaps via a protocol interaction with Alice) and that Trent can extract a full binding signature from the partial signature. However, the partial signature on its own is not binding for Alice. Bob then fulfils his commitment by sending Alice his signature, and if valid, Alice releases the full version of her signature to Bob. The protocol is fair since if Bob does not sign, Alice's partial signature is worthless to Bob, and if Bob does sign but Alice refuses to release her full signature then Bob can obtain it from Trent. So the arbiter Trent may only be required in case of dispute (these are commonly referred to as optimistic fair exchange protocols), but a certain amount of trust still has to be placed in Trent. However, the main problem that remains with such a scheme is that in general, appropriate arbitor are simply not available. Further details and references of such schemes can be found in the article "Breaking and Repairing Optimistic Fair Exchange from PODC 2003" Y. Dodis, and L. Reyzin, in ACM Workshop on Digital Rights Management (DRM), October 2003.

The other common method of solving the problem of fair exchange of signatures is the idea of timed release or timed fair exchange of signatures in which the two parties sign their respective messages and exchange their signatures little by little. There are various problems with this approach. The first is that the protocol is highly interactive with many message flows. The second is that one party, say Bob, may often be at an advantage in that he sometimes has (at least) one more bit of Alice's signature than she has of his. This may not be significant if the computing resources of the two parties are roughly equivalent, but if Bob has superior computing resources, this may put Bob at a significant advantage over Alice since Bob may terminate the protocol early and use his resources to compute the remainder of Alice's signature, while it may be infeasible for Alice to do the same. There are methods to reduce this type of problem which involve the use of special "timing" functions, but even if the fairness of the protocol is guaranteed by such methods, it is still too interactive for many applications. Further details and references for such schemes can be found in the paper "Timed Fair Exchange of Standard Signatures" J. Garay, and C. Pomerance in Proceedings Financial Crypto '03.

It may further be noted that the problem of avoiding one party's signature being abused by presentation to another party to prove some commitment by the first party to a non-existent transaction, can be avoided by use of a signature that can only be verified by a designated party (such as the other party in a transaction). Such a signature scheme (referred to as a Designated Verifier signature scheme) is described in the paper "Designated verifier proofs and their applications" M. Jakobsson, K. Sako and R. Impagliazzo in Lecture Notes in Computer Science 1996, vol 1070. Signatures of this type are ambiguous in that it is not possible for a party, who is not the signer or the designated verifier, to tell which of the signer or the designated verifier has created the signature. More particularly, in the implementation described in the above-referenced paper, the signatures are based on Schnorr signatures with the signer creating its signature using their own private key and the public key of the designated verifier. The designated verifier can produce an alternate signature on the same message using the verifier's own private key and the public key of the signer. The nature of these signatures is such that the verification operation as operated by a signature-checking party who is not the signer or designated verifier cannot tell whether a particular signature is one produced by the signer or is, in fact, a corresponding alternate signature produced by the designated verifier. Thus, whilst the designated verifier can prove that a signature created by the signer was so created (because the designated verifier knows that he did not), the designated verifier cannot prove this to an independent signature-checking party.

Another technique which was designed for different purpose but offers the same ambiguity property is ring signatures. A ring signature convinces an external verifier that a message has been signed by one of a number of possible independent signers without allowing the verifier to identify which signer it was. A 1-out-of-2 ring signature has all the security features of the designated verifier signature with one signer and one designated verifier. Further details and references of ring signature schemes can be found in the articles "How to leak a secret" R. Rivest, A. Shamir and Y. Tauman, in Advances in Cryptology—Asiacrypt 2001, LNCS 2248, pages 552-565, Springer 2001; and "1-out-of-n signatures from a variety of keys" M. Abe, M. Ohkubo and K. Suzuki, in Cryptology—Asiacrypt 2002, LNCS 2501, pages 415-432, Springer 2002.

It is an object of the present invention to provide a signature scheme for transactions that is fair. It is a more general object of the invention to provide a signature that is ambiguous until determined otherwise by the signer.

SUMMARY OF THE INVENTION

According to the present invention, there is provided a digital-signature method for use, in signing subject data, by a first party that has a first public/private key-pair; the method comprising the first party generating a keystone and using it, together with at least the private key of the first-party's key-pair, the public key of at least one other public/private key-pair, and the subject data, to create, in a first way, an ambiguous signature which an independent signature-checking party, without knowledge of the keystone, can only ambiguously verify as being one of a set of ambiguous signatures comprising: an ambiguous signature created in said first way by the first party, and a respective ambiguous signature created in a second way by a possessor of the private key of the or each said other key-pair; knowledge of the keystone enabling the signature-checking party to determine that the ambiguous signature created by the first party was created thereby.

Advantageously, in the method of the foregoing paragraph, the first party uses the keystone to generate, by means of a one-way function, a keystone fix that the first party then uses in the creation, in said first way, of its ambiguous signature on the subject data; the first party's ambiguous signature including a set of at least one keystone-fix-related element and being such that:

the said second way of creating an ambiguous signature generates an associated alternate keystone fix rather than using it as an input; and the signature-checking party requires a said set of at least one keystone-fix-related element to ambiguously verify a said ambiguous signature.

Upon the first party making the keystone available to the signature-checking party, the signature-checking party can carry out a verification process on a received data set that purports to come from the first party and comprises a said ambiguous signature and subject data; the verification process comprising the following operations in any order:

i) a determination of whether the or each element of said set of at least one keystone-fix-related element included in the ambiguous signature is derivable from the keystone, and ii) an ambiguous verification operation for determining, on the basis of the received data set and the public keys of the first and said at least one other key-pairs, whether the ambiguous signature in the data set is one of a set of ambiguous signatures comprising: an ambiguous signature created in said first way by the first party and a respective ambiguous signature created in said second way by the possessor of the private key of the or each said other key-pair;

positive determinations for both operations i) and ii) indicating that the signature in the data set is an ambiguous signature created in said first way and was therefore created by the first party on the subject data.

Advantageously, the present invention can be applied to the exchange of signatures between two or more parties.

Thus, certain embodiments of the present invention provide a concurrent-signaturemethod for simultaneously enabling signature verification of digitally-signed data exchanged between first and second parties that have associated respective public/private key-pairs, the method comprising the steps of:

a) the first party:
   generating a keystone and from this, a keystone fix;
   generating an ambiguous signature using the keystone fix, at least the private key of the first party's key-pair, the public key of the second party's key-pair, and first subject data;
   making available, at least to the second party, a first data set comprising the first subject data and the first-party's ambiguous signature including said keystone fix;

b) the second party:
   generating an ambiguous signature using the keystone fix generated by the first party, at least the private key of the second party's key-pair, the public key of the first party's key-pair, and second subject data;
   making available, at least to the first party, a second data set comprising the second-party's ambiguous signature and the second subject data;

c) the first party revealing the keystone to remove the ambiguity of the signatures so far as signature-checking parties are concerned.

Until the keystone is released, both ambiguous signatures are deniable. However, once the keystone is released, the ambiguous signatures are simultaneously transformed into binding signatures which bind the signed subject datas to their true respective signers.

Other embodiments of the present invention provide a digital signature method wherein each of n parties with respective public/private key-pairs, creates in turn an ambiguous signature based on:

at least the private key of its own key-pair,
the public keys of the other parties,
at least for the first n−1 signing parties, a keystone fix derived from a keystone created by the party concerned, and
the keystone fixes of the preceding (i−1) signing parties, if any;

the ambiguous signature of the i$^{th}$ party requiring knowledge of the keystones of the first i parties in said series to remove its ambiguity whereby the first signing party can control, subject to the prior release of the keystones of the other parties, when all the ambiguous signatures become unambiguous concurrently.

The present invention also encompasses apparatus for carrying out the methods of the invention, and computer program products for controlling computing apparatus to carry out the activities of one of the first, second and signature-checking parties according to the methods of the invention.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
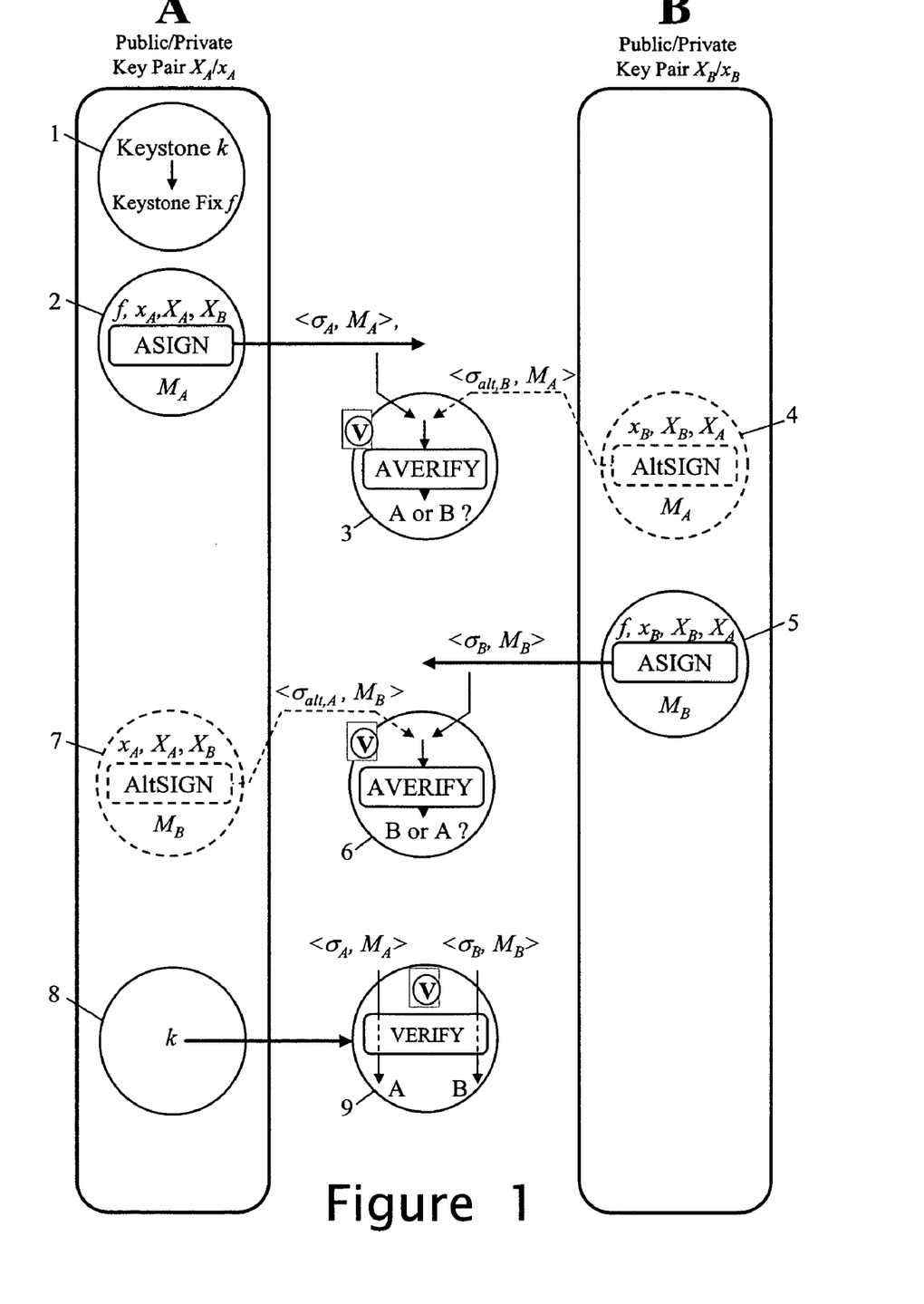
FIG. 1 is a diagram illustrating the general operation of a concurrent signature method embodying the invention.

FIG. 1 illustrates the main steps of a concurrent signature method, embodying the invention, that involves two signing parties A and B (also conventionally called Alice and Bob). By "concurrent signature" is meant that initially ambiguous signatures generated by A and B respectively on respective messages $M_A$, $M_B$, can simultaneously be made unambiguous and binding, this being achieved by the release of a piece of information herein referred to as a "keystone" initially only known to the party who first signs its message (this being party A in FIG. 1).

Considering FIG. 1 in more detail, the party A has a public/private key pair $X_A/x_A$ and party B has a public/private key pair $X_B/x_B$. Party A wishes to conduct a transaction involving sending a message $M_A$ to party B and receiving back a message $M_B$ from party B; however, party A does not wish the transaction to be binding until it has received the desired reply $M_B$ from party B. Party A therefore proceeds as follows.

First, party A generates a keystone k which it initially keeps secret and uses to derive, via a one-way function, a "keystone fix" element f (see task circle 1 of FIG. 1). Party A then uses the keystone fix f together with A's private key $x_A$ (and possibly A's public key), B's public key $X_B$, and A's message $M_A$, to create an ambiguous signature $\sigma_A$ (see box "ASIGN" in task circle 2). A now outputs the data set <$\sigma_A$, $M_A$> along with the keystone fix f—in fact, in the present specification, the convention is adopted that the keystone fix f actually forms a discrete component of the ambiguous signature $\sigma$. An ambiguous signature will therefore comprise multiple components; it is to be understood that these components, and in particular the keystone fix f can be separately output from one another.

The signature $\sigma_A$ is ambiguous in that an independent signature-checking party V, without knowledge of the keystone k, can only ambiguously verify the signature (see operation AVERIFY in task circle 3) as being either of: an ambiguous signature $\sigma_A$ created by A, and an alternate ambiguous signature $\sigma_{alt,B}$ created by B using an alternate signing process "AltSIGN" (see dashed task circle 4) that takes as input B's private key $x_B$ (and possibly B's public key), A's public key $X_A$, and the message $M_A$, and outputs the alternate ambiguous signature $\sigma_{alt,B}$ (including an alternate keystone fix component, different in value to f). In other words, whilst the ambiguous verify operation AVERIFY can determine whether a message has been signed either by A using ASIGN or by B using AltSIGN, AVERIFY cannot distinguish between these two possibilities. The ambiguous verify operation AVERIFY takes as input both a data set comprising an ambiguous signature and the subject message, and the public keys $X_A$, $X_B$ of the parties concerned.

It is to be noted that whilst the ambiguous signatures produced by the ASIGN and AltSIGN signing processes are indistinguishable so far as AVERIFY is concerned, the signing processes ASIGN and AltSIGN differ significantly; in particular, as already indicated, the ASIGN process requires the keystone fix as an input whereas, in contrast, the AltSIGN process generates the alternate keystone fix (that is, the alternate keystone fix is not an input to AltSIGN).

With regard to the AltSIGN task circle 4 in FIG. 1, this is shown dashed as it indicates the potential to create the ambiguous signature $\sigma_{alt,B}$ rather than the actual creation of such a signature. It will also be understood that the AVERIFY operation (task circle 3) need not actually be effected.

After B receives the data set <$\sigma_A$, $M_A$>, B responds with message $M_B$ which it digitally signs using ASIGN (see task circle 5) to produce an ambiguous signature $\sigma_B$; the inputs to this ASIGN process are the keystone fix f generated by A, B's private key $x_B$ (and possibly B's public key), A's public key $X_A$, and the message $M_B$. The signature $\sigma_B$ is ambiguous in the same way the signature $\sigma_A$ is ambiguous—that is, an independent signature-checking party V, without knowledge of the keystone k, can only ambiguously verify the signature $\sigma_B$ (see operation AVERIFY in task circle 6) as being either of: an ambiguous signature $\sigma_B$ created by B, and an alternate ambiguous signature $\sigma_{alt,A}$ created by A using the alternate signing process "AltSIGN" (see dashed task circle 7) with inputs of A's private key $x_A$ (and possibly A's public key), B's public key $X_B$, and the message $M_B$. Again, it is to be understood that the dashed task circle 7 simply indicates the potential to create the ambiguous signature $\sigma_{alt,A}$ rather than the actual creation of such a signature, and that the AVERIFY operation of task circle 6 need not actually be effected. The parties A and B are now at the stage that they have exchanged ambiguously signed messages $M_A$ and $M_B$. If A is satisfied with the message $M_B$, A can now remove the ambiguity of the signatures $\sigma_A$ and $\sigma_B$ by releasing the keystone k (see reference 8) thereby enabling the independent verifier V to verify (see VERIFY in task circle 9) that A has digitally signed $M_A$ with $\sigma_A$ and B has digitally signed $M_B$ with $\sigma_B$. The VERIFY process involves:

checking that the keystone fix f is derivable from the keystone k by using the same one-way function as used by A in originally generating f;

checking, using the checked keystone fix value f, that the data set <$\sigma_A$, $M_A$> satisfies AVERIFY in which case the signature $\sigma_A$ on $M_A$ must have been produced by A (this is because it is not feasible to have derived a keystone value that would have produced the alternate keystone fix value so that only a signature produced by ASIGN— that is, A's ambiguous signature—will satisfy AVERIFY for the keystone fix being used);

checking, using the checked keystone fix value f, that the data set <$\sigma_B$, $M_B$> satisfies AVERIFY in which case the signature $\sigma_B$ on $M_B$ must have been produced by A.

A more formal exposition of a concurrent signature method embodying the invention will next be given. The method uses a number of defined algorithms to carry out its processing operations and these algorithms will first be described individually for n parties before being linked in a description, given with reference to FIG. 2, of a concurrent-signature protocol that can be used in the case where n=2. It will be appreciated that in a practical embodiment of the concurrent signature method the algorithms will typically be implemented in program code used to control the operation of various items of computing apparatus associated with the parties involved (of course, dedicated hardware can alternatively be used to implement some or all of the cryptographic functions involved).

The concurrent-signature algorithms are specified below and apply to concurrent signature methods involving any number of parties n (including both the two-party method of FIG. 2 and the four-party methods described hereinafter with reference to FIGS. 3 and 4):

SETUP A probabilistic algorithm that on input of a security parameter l, outputs all the systems parameters and sets the public/private keys of all users in the system.

KGEN A probabilistic algorithm that maintains a list of tuples $<k_i, f_i>$ which is called the K-List, where $k_i$, and $f_i$ are each a set of strings. On input k, the algorithm proceeds as follows:

If k=ϵ, where ϵ is the empty string, select a random k' ∈ $Z_q$, and let k=k';

If the input k is already on the K-List in the tuple $<k_i, f_i>$, then output $f_i$;

Otherwise compute a keystone fix f for k, output f and add $<k, f>$ to the K-List.

KREVEAL An algorithm that on input of f, where f is a keystone fix produced by KGEN, finds the corresponding tuple $<k, f>$ on the K-List and outputs the keystone k of this tuple. If f is not on the K-List, then the algorithm outputs "invalid".

ASIGN A probabilistic algorithm that outputs an ambiguous signature σ on M in response to input of $<F, x_i, X_1 \ldots X_n, M>$, where F is a set of at least one keystone-fix-related element, $X_1 \ldots X_n$ are public keys (each for an individual possible signer), $x_i$ is the private key corresponding to the public key $X_i$, and M is a message. The public key $X_i$ of the signer is also referred to below as the "primary" public key, whereas the other public keys used in the signature are referred to as the "alternate" public keys. (It may be noted that for many specific implementations, $X_i$ will not be a required as an input to ASIGN either because it is not used in creating the ambiguous signature, or because it can be derived from $x_i$). The ambiguous signature σ includes a set R of at least one keystone-fix-related element (in certain cases this set will be the same as the set F).

AVERIFY An algorithm that outputs "accept" or "reject" in response to input of $<σ, X_1 \ldots X_n, M>$ where σ is an ambiguous signature $X_1 \ldots X_n$ are public keys, and M is a message, VERIFY An algorithm which takes as input $<k_{j, j=1, 2, \ldots, m}$, $S_{i, i=1, 2, \ldots, n}>$ where $k_j$ is a keystone and each $S_i$ is of form $S_i = <σ_i, X_1, X_2 \ldots X_n, M_i>$ where $σ_i$ is an ambiguous signature on $M_i$ and includes a set R of keystone-fix-related elements. For each $S_i$ the algorithm checks if each element of R in $σ_i$ is derivable from the keystone fix values produced by $KGEN(k_{j, j=1 \ldots m})$; if this is not the case, the algorithm terminates with output "reject". Otherwise, the algorithm runs AVERIFY for the next $S_i$ and outputs "accept" if all AVERIFYs outputs are "accept" and otherwise outputs "reject".

Figure 2:
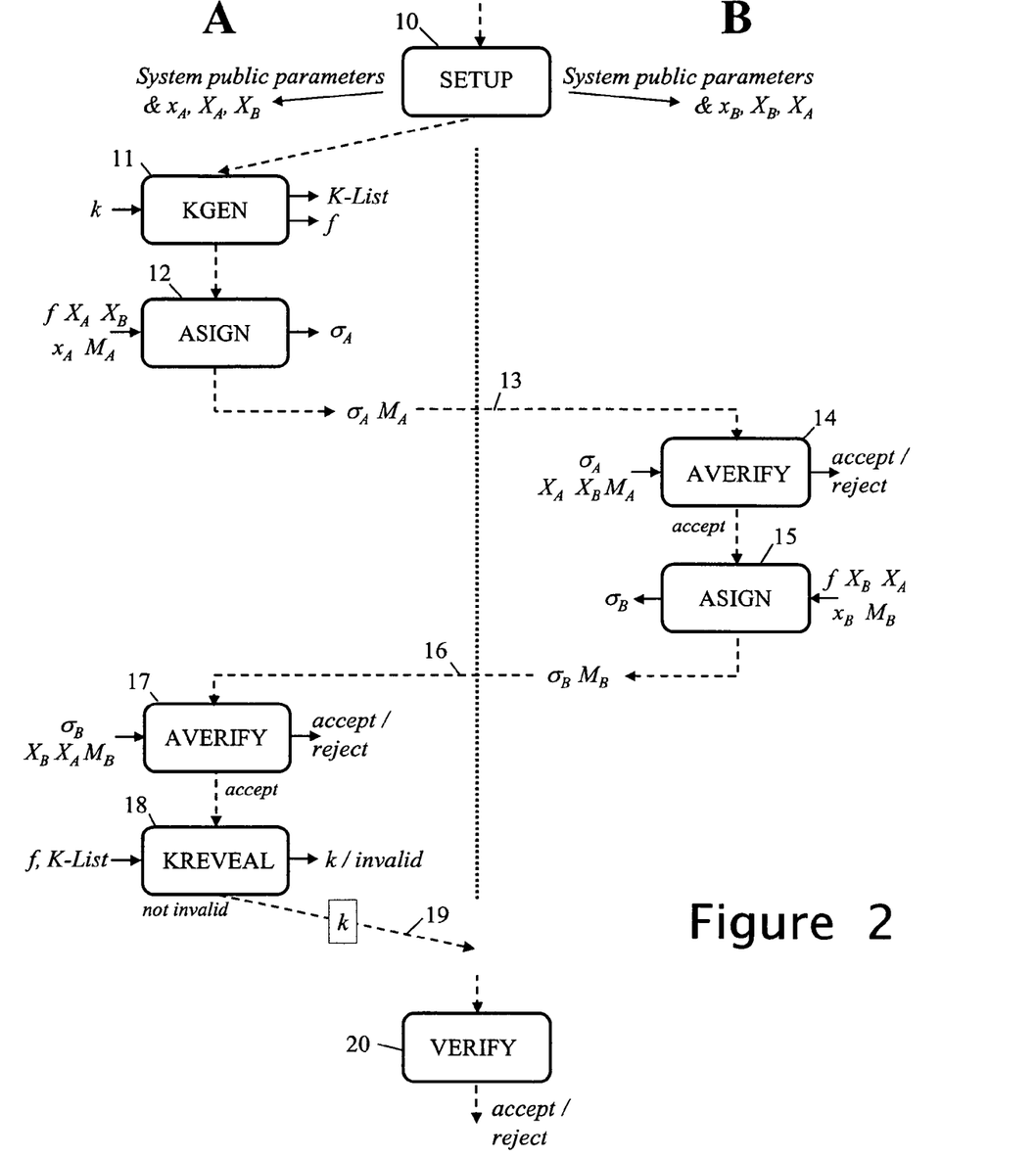
FIG. 2 is a diagram illustrating the flow of protocol exchanges, and processing operations effected, in the course of a concurrent signature protocol embodying the invention.

FIG. 2 illustrates the use of the foregoing algorithms for a concurrent signature protocol exchange between two parties A and B (or, conventionally, Alice and Bob). The party that creates the keystone and sends the first ambiguous signature is termed the initial signer and, in this example, this is party A; the party who responds to the initial signature by creating another ambiguous signature is termed the matching signer, this being party B in this example. The subscripts A and B are used to indicate the initial signer A and matching signer B respectively. In FIG. 2, the flow of the protocol is depicted by the dashed arrows whilst solid arrows are used to indicate the inputs and outputs of the various signature algorithms.

The operation of the concurrent signature protocol is as follows:

At step 10: A and B run SETUP to determine the parameters of the scheme. In particular, on completion of SETUP, A has public and private keys $X_A$ and $x_A$ respectively and B has public and private keys $X_B$ and $x_B$ respectively. A and B each know the other's public key. One of the parties (here A), proceeds first and takes the role of initial signer.

At step 11: A picks a random keystone k, and computes a keystone fix f=KGEN(k).

At step 12: A runs the ASIGN algorithm, using as inputs the keystone fix f (for the set F), A's own private key $x_A$, A's public key $X_A$ as the primary public key, B's public key $X_B$ as the alternate public key, and a message $M_A$ chosen by A for signature. The output of ASIGN is A's ambiguous signature on $M_A$:

$$σ_A = ASIGN(f, x_A, X_A, X_B, M_A)$$

which A sends to B along with the message $M_A$ (dashed arrow 13). The signature $σ_A$ includes the keystone fix f as the sole element of the set R. The elements $σ_A$ and M can passed to B in any suitable manner and may be passed independently of each other.

At step 14: Upon receipt of A's ambiguous signature $σ_A$, B verifies the signature by checking that: $AVERIFY(σ_A, X_A, X_B, M_A)$="accept". If not B aborts, otherwise B proceeds to step 15.

At step 15: B runs the ASIGN algorithm using as inputs the keystone fix f (for F), B's own private key $x_B$, B's public key $X_B$ as the primary public key, A's public key $X_A$ as the alternate public key, and a message $M_B$ chosen by B for signature. B uses the same keystone fix f in his signature as A did to produce $σ_A$. The output of ASIGN is B's ambiguous signature $σ_B$ on message $M_B$:

$$σ_B = ASIGN(f, x_B, X_B, X_A, M_B)$$

which B sends to A along with message $M_B$ (dashed arrow 16). Again, the set R for this signature is formed by f.

At step 17: Upon receipt of B's ambiguous signature $σ_B$, A verifies the signature by checking that $AVERIFY(σ_B, X_B, X_A, M_B)$="accept". If the output of AVERIFY is "reject" A aborts, otherwise A proceeds to step 18.

At step 18: A publishes the keystone k=KREVEAL(f).

At step 20: Once the keystone k has been released by A, the keystone fix f can be shown to be derived from keystone k and $<k, S_A>$ and $<k, S_B>$ will both be accepted by VERIFY where:

$$S_A = <σ_A, X_A, X_B, M_A>$$

$$S_B = <σ_B, X_B, X_A, M_B>$$

First Specific Two-Party Implementation

A first specific implementation of the FIG. 2 concurrent signature method will now be described, this implementation being based on a development of the form of Schnorr signature used in the Designated Verifier scheme referred to in the introductory portion of the present specification.

The concurrent-signaturealgorithms(SETUP, KGEN, KREVEAL, ASIGN, AVERIFY and VERIFY) are as follows:

SETUP Two large primes p and q are selected such that q|p−1. These are published with an element g of $(Z/pZ)^*$ of order q. Two suitable hash functions $H_1$, $H_2$: $\{0,1\}^*$ are also selected (such as any of the SHA Secure Hash Algorithms). Private keys chosen randomly are of the form $x_i \in Z_q$, and are kept secret. The public keys are computed as:

$$X_i = g^{x_i} \bmod p$$

and are made public.

KGEN A probabilistic algorithm that takes as input $k \in Z_q$ where k is a keystone. The algorithm maintains a list of tuples $\langle k_i, f_i \rangle$ which is called the K-List. On input k, the algorithm proceeds as follows:

- if k=ε, where ε is the empty string, select a random k' ∈ $Z_q$, and let k=k';
- If the input k is already on the K-List in the tuple $\langle k_i, f_i \rangle$, then output $f_i$;
- Otherwise the algorithm outputs a keystone fix f=⟨u,v⟩ where u=$H_1$(k||0), and v=$H_1$(k||1), and adds ⟨k,f⟩ to the K-List.

KREVEAL An algorithm that on input f=⟨u,v⟩ where f is a keystone fix. If there exists a tuple ⟨k,f⟩ on the K-List, then the algorithm returns k, otherwise it outputs "invalid".

ASIGN A signer takes as inputs $\langle f, x_1, X_1, X_2, M \rangle$, where f=⟨u, v⟩ is a keystone fix, $x_1$ is the private key of the signer, $X_1$ is the primary public key (the signer's public key), $X_2$ is the alternate public key, and M is a message, and proceeds as follows:

The signer picks a random value $t \in Z_q$ and then computes the values $$w = g^u X_2^v \bmod p$$

$$h = H_2(g^t \| w \| M)$$

$$s = t - x_1(h+u) \bmod q$$

The signer outputs the ambiguous signature σ=⟨s, h, f⟩.

It may be noted that in the present example, ASIGN need not take $X_1$ as an input since this can be computed from g and $x_1$.

AVERIFY A verifier takes input $\langle \sigma, X_1, X_2, M \rangle$ where σ=⟨s, h, f⟩ is an ambiguous signature, $X_1$ and $X_2$ are the primary and alternate public keys, and M is a message. The algorithm proceeds as follows:

The verifier computes:

$$(g^t) = g^s X_1^{h+u} \bmod p$$

which should correspond to $g^t$ as $t = s + x_1(h+u)$ $$w' = g^u X_2^v \bmod p$$

which should correspond to w $$h' = H_2((g^t)' \| w' \| M)$$

The verifier then checks that the equation:

$$h' = h$$

holds, and if so, outputs "accept"; otherwise the verifier outputs "reject".

VERIFY An algorithm which takes as input $\langle k, S_i \rangle$ where k is a keystone and each $S_i = \langle \sigma_i, X_{i1}, X_{i2}, M_i \rangle$ where $\sigma_i$ is an ambiguous signature on $M_i$ and includes the keystone fix f, and $X_{i1}$ and $X_{i2}$ are primary and alternate public keys. If not all $S_i$ have the same keystone fix f, terminate and output "reject", otherwise check if KGEN(k)=f. If the check KGEN(k)=f fails, terminate and output "reject", otherwise run AVERIFY for each $S_i$. Output "accept" only if all AVERIFYs output "accept", otherwise output "reject".

Referring to the concurrent signature protocol exchanges illustrated in FIG. 2, in the case of the present specific implementations of the signature algorithms, the elements $h_A$ and $s_A$ of the ambiguous signature $\sigma_A$ output by ASIGN at step 12 take the form:

$$h_A = H_2(g^{t_A} \| g^u (X_B)^v \bmod p \| M_A)$$

where $t_A$ is the random number t used by this instance of ASIGN, $$s_A = t_A - x_A(h_A + i) \bmod q$$

and the value of h' computed during execution of AVERIFY in step 14 is:

$$h_A' = H_2(g^{s_A}(X_A)^{h_A+u} \| g^u (X_B)^v \bmod p \| M_A)$$

Similarly, the elements $h_B$ and $s_B$ of the ambiguous signature $\sigma_B$ output by ASIGN at step 15 take the form:

$$H_B = H_2(g^{t_B} \| g^u (X_A)^v \bmod p \| M_B)$$

where $t_B$ is the random number t generated by this instance of ASIGN, $$s_B = t_B - x_B(h_B + u) \bmod q$$

and the value of h' computed during execution of AVERIFY in step 14 is:

$$h_B' = H_2(g^{s_B}/(X_B)^{h_B+u} \| g^u (X_A)^v \bmod p \| M_B)$$

As regards the ambiguity of the signatures $\sigma_A$ and $\sigma_B$, the following algorithm AltSIGN illustrates how one party, here called the alternate signer, can generate a signature that is capable of satisfying AVERIFY with the other party's public key as the primary public key $X_1$ and the alternate signer's public key as the alternate public key $X_2$ (and therefore indistinguishable, so far as AVERIFY is concerned, from a signature σ produced by the other party using ASIGN). The AltSIGN algorithm takes as input $\langle x_2, X_2, X_1, M \rangle$, the alternate signer being the party associated with the public/private key pair $X_2/x_2$.

The alternate signer B picks random values $\alpha \in Z_q$, $\beta \in Z_q$, $s \in Z_q$ and then computes the values $$w = g^\alpha \bmod p$$

$$g^t = g^s (X_1)^\beta \bmod p$$

$$h = H_2(g^t \| w \| M)$$

$$u = \beta - h \bmod q$$

$$v = (\alpha - u)/x_2 \bmod q$$

The alternate ambiguous signature $\sigma_{alt}$ is then =⟨s, h, f⟩ where f is the alternate key fix comprising the values of u and v just computed in AltSIGN.

When AVERIFY is applied to $\sigma_{alt}$, the message M and the primary and alternate public keys $X_1$, $X_2$, the verifier computes:

$$(g^t)' = g^s X_1^{h+u} \bmod p$$

which should correspond to $g^t$ as $h+u=\beta$ $$w' = g^u X_2^v \bmod p$$

which should correspond to w as $X_2^v = (g^{x_2})^{(\alpha-u)/x_2} = g^{(\alpha-u)} \bmod p$ $$h' = H_2((g^t)' \| w' \| M)$$

The verifier then checks that the equation h'=h is satisfied.

As already noted in general terms in discussing FIG. 1, the alternate keystone fix values of u and v are computed during the course of AltSIGN and are not initial input values as is the case for ASIGN. As a result, it is not computationally feasible to determine the keystone k from which the alternate keystone fix values u and v could have been derived (the hash function $H_1$ being a one-way function). Therefore revelation of the keystone k by the initial signer A is sufficient to remove ambiguity from the ambiguous signatures since it establishes the proper keystone fix values v and u—if AVERIFY is satisfied using these values, then the identity of the signer of a signature being tested by AVERIFY is given by the primary public key $X_1$ used in the AVERIFY algorithm.

Second Specific Two-Party Implementation

A second specific implementation of the FIG. 2 concurrent signature method will now be described, this implementation being based on a development of the form of Schnorr signature used in the ring signature scheme referred to in the above-mentioned paper "1-out-of-n signatures from a variety of keys" M. Abe, M. Ohkubo and K. Suzuki, in Cryptology—Asiacrypt 2002, LNCS 2501, pages 415-432, Springer 2002.

The concurrent-signaturealgorithms(SETUP, KGEN, KREVEAL, ASIGN, AVERIFY and VERIFY) are as follows:

SETUP Two large primes p and q are selected such that q|p−1. These are published with an element g of $(Z/pZ)^*$ of order q. Two suitable hash functions $H_1, H_2: \{0,1\}^*$ are also selected (such as any of the SHA Secure Hash Algorithms). Private keys chosen randomly are of the form $x_i \epsilon Z_q$, and are kept secret. The public keys are computed as:

$$X_i = g^{xi} \bmod p$$

and are made public.

KGEN A probabilistic algorithm that takes as input $k \epsilon Z_q$ where k is a keystone. The algorithm maintains a list of tuples $<k_i, f_i>$ which is called the K-List. On input k, the algorithm proceeds as follows:

if k=ϵ, where ϵ is the empty string, select a random $k' \epsilon Z_q$, and let k=k';

If the input k is already on the K-List in the tuple $<k_i, f_i>$, then output $f_i$;

Otherwise the algorithm outputs a keystone fix $f=H_1(k)$ adds <k, f> to the K-List.

KREVEAL An algorithm that on input a keystone fix f. If there exists a tuple <k, f> on the K-List, then the algorithm returns k, otherwise it outputs "invalid".

ASIGN A signer takes as inputs $<f, x_1, X_2, M>$, where f is a keystone fix, $x_1$ is the private key of the signer, $X_1$ is the primary public key (the signer's public key), $X_2$ is the alternate public key, and M is a message, and proceeds as follows:

The signer picks a random value $t \epsilon Z_q$ and then computes the values $$h=H_2(g^t X_2^f \| M)$$

$$w=h-f \bmod q$$

$$s=t-wx_1 \bmod q$$

The signer outputs the ambiguous signature σ=<s, w, f>.

It may be noted that in the present example, ASIGN need not take $X_1$ as an input since this can be computed from g and $x_1$.

AVERIFY A verifier takes input $<\sigma, X_1, X_2, M>$ where σ=<s, w, f> is an ambiguous signature including keystone fix f $X_1$ and $X_2$ are the primary and alternate public keys, and M is a message. The algorithm proceeds as follows:

The verifier computes:

$$h=f+w \bmod q$$

$$h'=H_2(g^s X_1^w X_2^f \bmod p \| M)$$

It may be noted that the term $(g^s X_1^w X_2^f \bmod p)$ should be equal to the term $(g^t X_2^f \bmod p)$ used in computing h in ASIGN, since:

$$g^s X_1^w X_2^f = g^{(t-wx1)} g^{x1w} g^{x2f} = g^t g^{x2f} = g^t X_2^f \bmod p$$

The verifier checks whether:

$$h'=h$$

holds, and if so, outputs "accept"; otherwise outputs "reject".

VERIFY An algorithm which takes as input $<k, S_i>$ where k is a keystone and each $S_i=<\sigma_i, X_{i1}, X_{i2}, M_i>$ where $\sigma_i$ is an ambiguous signature on Mi and including keystone fix f and $X_{i1}$ and $X_{i2}$ are primary and alternate public keys. If not all $S_i$ have the same keystone fix f, terminate and output "reject", otherwise check if KGEN(k)=f. If the check KGEN(k)=f fails, terminate and output "reject", otherwise run AVERIFY for each $S_i$. Output "accept" only if all AVERIFYs output "accept", otherwise output "reject".

Referring to the concurrent signature protocol exchanges illustrated in FIG. 2, in the case of the present specific implementations of the signature algorithms, the elements $w_A$ and $s_A$ of the ambiguous signature $\sigma_A$ output by ASIGN at step 12 take the form:

$$h_A=H_2(g^{tA} X_B^f \| M_A)$$

$$w_A=h_A-f \bmod q$$

$$s_A=t_A-w_A x_A \bmod q$$

where $t_A$ is the random number t used by this instance of ASIGN, and f is the keystone fix computed by A in step 11;

and the value of $h_A'$ computed during execution of AVERIFY in step 14 is:

$$h_A'=H_2(g^{sA} X_A^{wA} X_B^f \| M_A) \bmod q.$$

Similarly, the elements $w_B$ and $s_B$ of the ambiguous signature $\sigma_B$ output by ASIGN at step 15 take the form:

$$h_B=H_2(g^{tB} X_A^f \| M_B)$$

$$w_B=h_B-f \bmod q$$

$$s_B=t_B-w_B x_B \bmod q$$

where $t_B$ is the random number t used by this instance of ASIGN, and the value of $h_B'$ computed during execution of AVERIFY in step 14 is:

$$h_B'=H_2(g^{sB} X_B^{wB} X_A^f \| M_B) \bmod q.$$

As regards the ambiguity of the signatures $\sigma_A$ and $\sigma_B$, the following algorithm AltSIGN illustrates how one party, here called the alternate signer, can generate a signature that is capable of satisfying AVERIFY with the other party's public key as the primary public key $X_1$ and the alternate signer's public key as the alternate public key $X_2$ (and therefore indistinguishable, so far as AVERIFY is concerned, from a signature σ produced by the other party using ASIGN). The AltSIGN algorithm takes as input $<x_2, X_1, M>$, the alternate signer being the party associated with the public/private key pair $X_2/x_2$.

The alternate signer picks random values $\alpha \in Z_q$ and $t \in Z_q$ and then computes the values $$h = H_2(g^t X_1^\alpha \| M_A)$$

$$f = h - \alpha \bmod q$$

$$s = t - f x_B \bmod q$$

The alternate ambiguous signature $\sigma_{alt}$ is then $=\langle s, \alpha, f \rangle$, which is indistinguishable from $\sigma = \langle s, w, f \rangle$ above from the external verifier's point of view.

Thus, when AVERIFY is applied to $\sigma_{alt}$ the verifier then checks that the equation $$\alpha + f = H_2(g^s X_1^\alpha X_2^f \| M_A) \bmod q$$

is satisfied.

Again, the alternate keystone fix value of f is computed during the course of AltSIGN and is not an initial input value as is the case for ASIGN. As a result, it is not computationally feasible to determine the keystone k from which the alternate keystone fix f could have been derived (the hash function $H_1$ being a one-way function). Therefore revelation of the keystone k by the initial signer A is sufficient to remove ambiguity from the ambiguous signatures since it establishes the proper keystone fix value f—if AVERIFY is satisfied using these values, then the identity of the signer of a signature being tested by AVERIFY is given by the primary public key $X_1$ used in the AVERIFY algorithm.

In the foregoing two-party concurrent signature examples, it would be possible for one or other or both of A and B to create its ASIGN signature using for the alternate public key the public key of a new, unbound, public/private key pair chosen by the signing party; the signing party publishes both the public and private keys of this new key pair with the result that anyone could be responsible for generating an alternate signature using AltSIGN. In effect, the potential alternate signer is an anonymous signer. The ambiguity in the signature is only removed when the signing party releases the keystone. Where both A and B choose to do this, they could each use a respective new public/private key pair or B could use the same new key pair as A. One drawback of A doing this is that B cannot then be sure at step 14 in FIG. 2 that $M_A$ has actually been signed by A; however, where B uses such a key pair, it is possible for A at step 17 to determine whether $M_B$ has been signed by B because it knows what is the correct value of the keystone fix f (that is, the value derived from the keystone k).

It may be noted that the party A can also effectively carry out the foregoing concurrent signature methods with multiple other parties each of which has its own respective public/private key-pair; in this case, each of these other parties acts like party B in the above-described embodiments but now party A does not release the keystone until satisfied with the messages it receives back from every one of these other parties. In this multiple other-party case, party A can create a respective digitally-signedmessage for each other party using either that party's public key or an anonymous public key (with generally-known corresponding private key) as the alternate public key in ASIGN; alternatively, party A can use the same digitally-signed message for all other parties with an anonymous public key being used as the alternate public key in ASIGN. Furthermore, each other party when responding can use either party A's public key or an anonymous public key (with generally-known corresponding private key) as the alternate public key in ASIGN; each of the other parties will, of course, use the same keystone fix as party A in creating its ambiguous signature.

The involvement of multiple parties with the initial signer in the foregoing manner is effectively a collection of two-party signatures with the initial signer being clearly at the hub of activity and the other parties having no real relationship with each other. A concurrent signature arrangement that places the parties in a more equal position even when there are three or more parties will next be described.

Concurrent Signatures with More than Two Parties

The above two-party concurrent signature example based on ring signatures can be extended to n parties to provide fairness for each of the parties involved. The algorithms ASIGN and AVERIFY given above for the ring-signature example are readily extended to the n-party case by including additional terms corresponding to the public keys of the additional parties as will become apparent from the following example with n=4. The four parties involved are identified below as parties A, B, C and D with respective public/private key pairs $X_A/x_A$, $X_B/x_B$, $X_C/x_C$, and $X_D/x_D$ provided by SETUP.

A Initiates the Protocol:

A uses KGEN to creates a keystone value $k_A$ at random and compute (n−1) components of a keystone fix $f_A$ where n is the number of parties; in this example, n=4 so three components $f_{A1}$, $f_{A2}$ and $f_{A3}$ are computed:

$$f_{A1} = H(k_A \| 1), f_{A2} = H(k_A \| 2), f_{A2} = H(k_A \| 3)$$

It will be appreciated that the constants concatenated with $k_A$ can have any predetermined values provided they are different from each other.

Using $F_A = \langle f_{A1}, f_{A2}, f_{A3} \rangle$, A's private key, the public keys of the other parties, and $M_A$ as inputs, A computes an ambiguous ring signature as follows (this being the ASIGN process for this concurrent signature method):

A chooses $t_A \in Z_q$ at random

A computes $$h_A = H_2(g^{t_A} X_B^{f_{A1}} X_C^{f_{A2}} X_D^{f_{A3}} \bmod p \| M_A)$$

(note the additional terms $X_C^{f_{A2}} X_D^{f_{A3}}$ as compared to the two party case)

$$w_A = h_A - (f_{A1} + f_{A2} + f_{A3}) \bmod q$$

(the term $(f_{A1} + f_{A2} + f_{A3})$ corresponds to the sum of the exponents of the public keys in the expression for $h_A$)

$$s_A = t_A - w_A x_A \bmod q$$

A releases the ring signature $\langle s_A, w_A, f_{A1}, f_{A2}, f_{A3} \rangle$, the ordering of the last four quantities indicating their association, as exponents, with the public keys of the parties A, B, C and D respectively (for example, in AVERIFY as will become clear hereinafter). The elements $f_{A1}, f_{A2}, f_{A3}$ form the set $R_A$.

B Follows A:

B uses KGEN to creates another keystone value $k_B$ at random and compute a single-component keystone fix $f_{B1} = H(k_B \| 1)$, Using $F_B = \langle f_{A1}, f_{A2}, f_{A3}, f_{B1} \rangle$, B's private key, the public keys of the other parties, and $M_B$ as inputs, B computes its ambiguous ring signature as follows (again, this is the ASIGN process):

B chooses $t_B \in Z_q$ at random

B computes $$h_B = H_2(i \, g^{t_B} X_A^{(f_{A1} \oplus f_{A2})} X_C^{F_{A3}} X_C^{f_{B1}} \bmod p \| M_B)$$

$$w_B = h_B - ((f_{A1} \oplus f_{A2}) + f_{A3} + f_{B1}) \bmod q$$

$$s_B = t_B - w_B x_B \bmod q$$

B releases the ring signature $<s_B, (f_{A1} \oplus F_{A2}), w_B, f_{A3}, f_{B1}>$. Again, the ordering of the last four quantities indicates their association, as exponents, with the public keys of the parties A, B, C and D respectively. The elements $(f_{A1} \oplus f_{A2})$, $f_{A3}$, $f_{B1}$ of the signature form the set $R_B$.

C Follows B:

C uses KGEN to create another keystone value $k_C$ at random and compute a single-component keystone fix $f_{C1}=H(k_C\|1)$, Using $F_C=<(f_{A1}\oplus f_{A2}), f_{A3}, f_{B1}, f_{C1}>$, C's private key, the public keys of the other parties, and $M_C$ as inputs, C computes its ambiguous ring signature as follows (again, this is the ASIGN process):

C chooses $t_C \in Z_q$ at random

C computes $$h_C = H_2(g^{t_C} X_A^{(f_{A3} \oplus f_{B1})} X_D^{f_{C1}} \bmod p \| M_C)$$

$$w_C = h_C - ((f_{A1} \oplus f_{A2}) + (f_{A3} \oplus f_{B1}) + f_{C1}) \bmod q$$

$$s_C = t_C - w_C x_C \bmod q$$

C releases the ring signature $<s_C, (f_{A3}\oplus f_{B1}), (f_{A1}\oplus f_{A2}), w_C, f_{C1}>$ Again, the ordering of the last four quantities indicates their association, as exponents, with the public keys of the parties A, B, C and D respectively. The elements $(f_{A3}\oplus f_{B1}), (f_{A1}\oplus f_{A2}), f_{C1}$ of the signature form the set $R_C$.

D Follows C:

D does not generate a keystone or keystone fix.

D uses $F_D=<(f_{A3}\oplus f_{B1}), (f_{A1}\oplus f_{A2}), f_{C1}>$, D's private key, the public keys of the other parties, and $M_D$ as inputs, to compute its ambiguous ring signature as follows (again, this is the ASIGN process):

D chooses $t_D \in Z_q$ at random

D computes $$h_D = H_2(g^{t_D} X_A^{f_{C1}} X_B^{(f_{A3}\oplus f_{B1})} X_C^{(f_{A1}\oplus f_{A2})} \bmod p \| M_D)$$

$$w_D = h_D - (f_{C1} + (f_{A1}\oplus f_{A2}) + (f_{A3}\oplus f_{B1})) \bmod q$$

$$s_D = t_D - w_D x_D \bmod q$$

D releases the ring signature $<S_D, f_{C1}, (f_{A3}\oplus f_{B1}), (f_{A1}\oplus f_{A2}), w_D>$ Again, the ordering of the last four quantities indicates their association, as exponents, with the public keys of the parties A, B, C and D respectively. The elements $f_{C1}, (f_{A3}\oplus f_{B1}), (f_{A1}\oplus f_{A2})$ of the signature form the set $R_D$.

Keystone Release

After having the four ring signatures, C uses KREVEAL to release $k_C$.

After having the four ring signatures and $k_C$, B uses KREVEAL to release $k_B$.

After having the four ring signatures and both $k_C$ and $k_B$, A uses KREVEAL to releases $k_A$.

With all keystones $k_A$, $k_B$ and $k_C$ released, the four ring signatures become unambiguous. In fact, it is keystone $k_A$ that is the true keystone since, provided the other keystones have been released first, its release renders all the signatures unambiguous simultaneously.

It will be understood that some way needs to be provided of distinguishing, in each signature, between the element w and the elements of the set R of keystone-fix-related components so that a subsequent signer uses the correct parts of a preceding signature when deriving its own signature. This can be achieved in a variety of ways, including, for example, by explicit indications embedded in the signature, or by ordering the parts of the signature as indicated and then using a knowledge of the order of generation of the signatures to identify the parts of the signature.

The AVERIFY algorithm on receiving any of the ambiguous signatures and the related message M, assumes the first value in the signature to be the quantity s and the remaining values to be exponents $y_A, y_B, y_C, y_D$ to be applied to the public keys of the parties. The verifier first computes:

$$h = y_A + y_B + y_C + y_D \bmod q$$

(that is, the sum of all exponent values; this corresponds to f+w for the two-party case already described)

The verifier then computes:

$$h' = H_2(g^s X_A^{y_A} X_B^{y_B} X_C^{y_C} X_D^{y_D} \bmod p \| M)$$

The verifier then checks whether:

$$h' = h$$

holds, and if so, outputs "accept"; otherwise it outputs "rejects".

With regard to the concurrent-signature algorithm VERIFY, in the present case this involves the verifier checking that the components of $R_A$, $R_B$, $R_C$ and $R_D$ can all be derived from the keystones $K_A$, $K_B$ and $K_C$ and that each signature satisfies AVERIFY.

Figure 3:
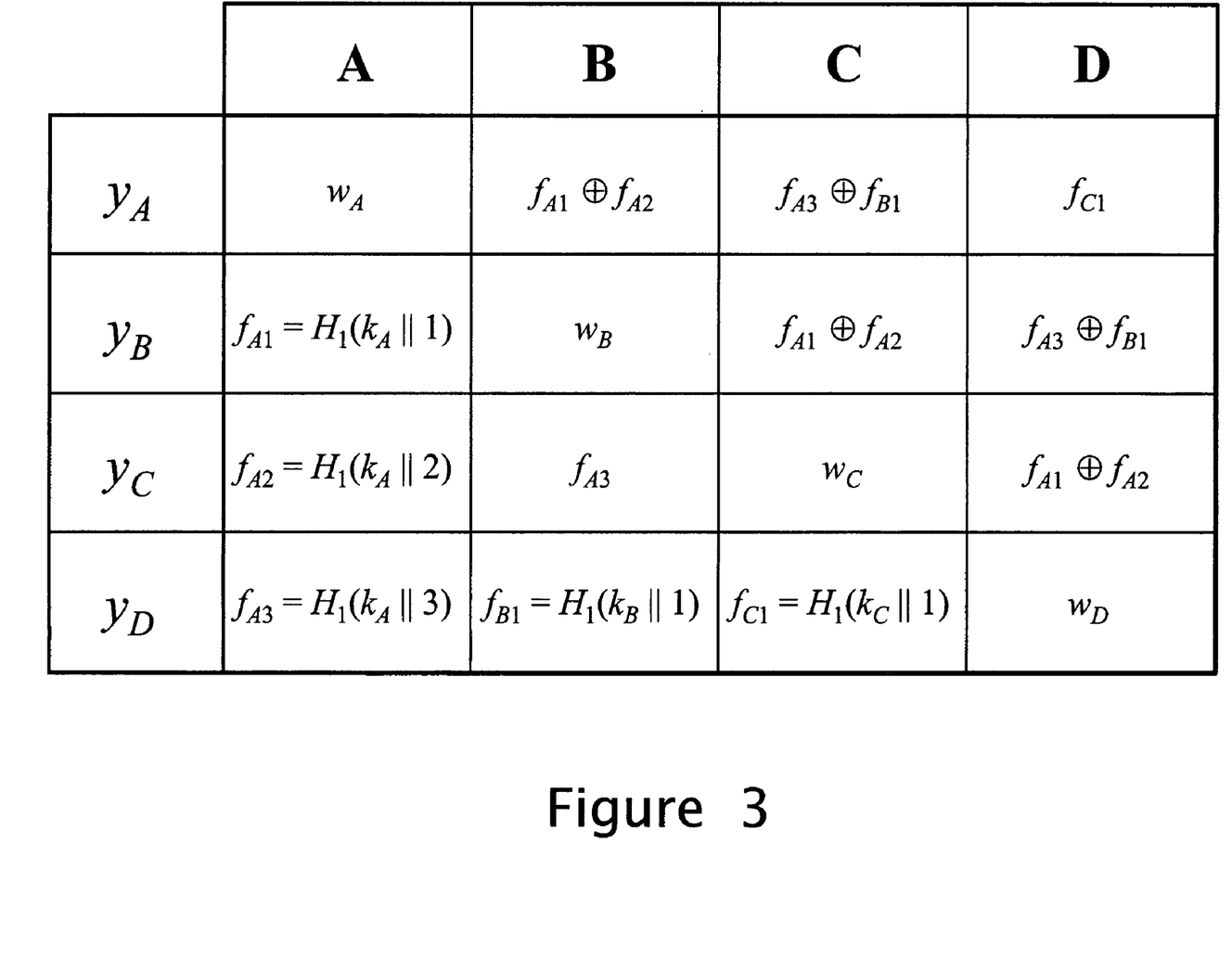
FIG. 3 is a table showing values used by each of four parties when computing their respective ambiguous signatures in a concurrent signature method based on ring signatures.
Figure 4:
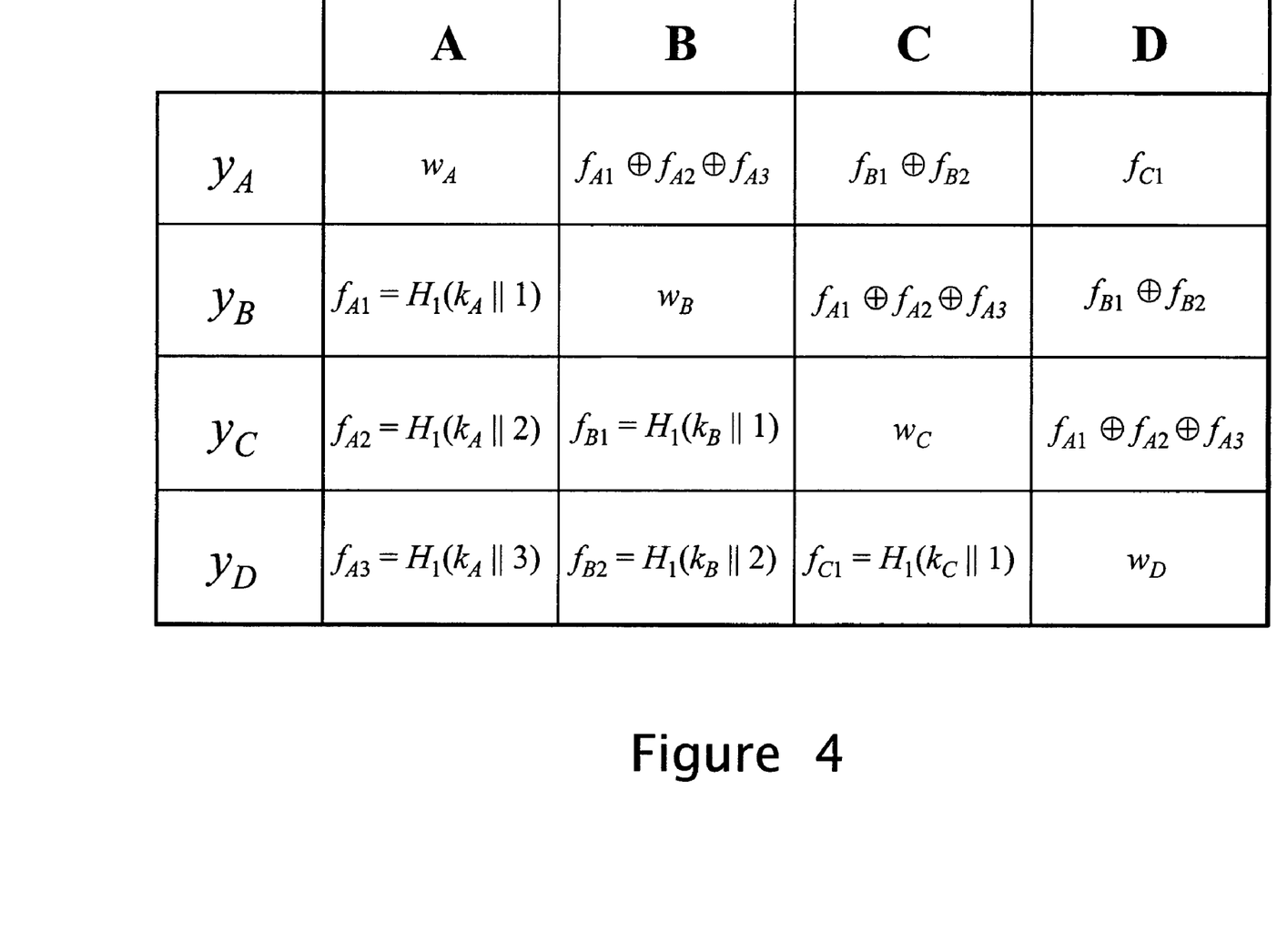
FIG. 4 is a table similar to FIG. 3 but showing an alternative set of values.

Returning to a consideration of the ASIGN process, FIG. 3 shows in tabular form the values $y_A, y_B, y_C, y_D$ provided by each of the parties A, B, C and D. In fact, for each of the parties B, C and D, there exist a number of possible ways of deriving the values $y_A, y_B, y_C, y_D$ and FIG. 3 only gives one example. In general terms, the rules for deriving the values of $y_A, y_B, y_C, y_D$ can be stated as follows:

The initial signer A creates respective keystone fix component values to form the exponent values $y_B, y_C, y_D$, this set of values constituting the set $R_A$.

The intermediate parties B and C each create a single respective keystone fix component.

Each party other than the initial signer derives the set of exponent values to be used in respect of the other parties by using its own keystone fix component (if any) and the keystone fix components or component combinations provided by a preceding party (all keystone fix components of the preceding parties should be used). However, the exponent value chosen for a particular party should not be the same as that already used for that party by a preceding party. This set of exponent values constitutes the set R in the signature of the party concerned.

Each party computes its own related exponent value (that is, its value for w) from the exponent values it has determined for the other parties.

By way of example, the FIG. 3 table could be modified by C choosing:

$$y_A = f_{B1}$$

$$y_B = (f_{A1} \oplus f_{A2} \oplus f_{A3})$$

and D choosing:

$$y_B = f_{B1}$$

$$y_C = (f_{A1} \oplus f_{A2} \oplus f_{A3})$$

A further possibility in deriving the exponent values is for at least one of the intermediate parties to generate more than one keystone fix component. The FIG. 4 table illustrates one possible way of doing this where the second party B generates two keystone fix components which it uses for respective exponent values, a third exponent value then being derived by the Exclusive OR combination of the keystone fix components generated by party A. This combination is also used by parties C and D for one exponent value, with anther value being based on the Exclusive OR combination of the two keystone fix components generated by party B.

It may also be noted that the final party D could generate its own keystone and from it a keystone fix for use in forming its ambiguous signature; however, this is generally unnecessary and inefficient since party D would normally then release its keystone with its signature.

The extension of the foregoing 4-party examples to n-parties will be apparent to persons skilled in the art. Thus, the FIG. 4 example can be expressed for the n party case as follows. Except for the last ($n^{th}$) signer, each signer creates one keystone value and the $i^{th}$ signer computes a keystone fix with n−i components from his own keystone value; each such component forms one exponent value and further exponent values are obtained by using, for each preceding party, the Exclusive Or combination of the keystone fix components generated by that party. The $i^{th}$ signer releases his keystone value after received the n ring signatures and the last n−i−1 keystones.

It will be appreciated that many variants are possible to the above described embodiments of the invention. Thus, in the foregoing examples, the public/private key pairs (such $X_A/x_A$ and $X_B/x_B$ in the two-party embodiments) can be any type of keys, such as asymmetric keys based on discrete-logarithm problem (as explained above) or asymmetric keys based on factorization problem (e.g. RSA keys). Thus, the corresponding ambiguous signatures can be discrete-log type signatures or RSA type signatures. Furthermore, the key pairs in a single concurrent signature scheme do not have to be same; thus in a two-party scheme, one key pair can be of the discrete-log type (with the corresponding signature being, for example, a Schnorr type signature) and the other key pair of the RSA type (with the corresponding signature being an RSA type signature). The techniques to be used for achieving concurrent signatures from a variety of key types is the same as described for ring signatures in the above-referenced paper "1-out-of-n signatures from a variety of keys" M. Abe, M. Ohkubo and K. Suzuki; application of these techniques to concurrent signatures will be apparent to persons skilled in the art.

Whilst each party that generates a keystone fix component has, in the foregoing examples, been described as doing so from a single keystone value created by that party, it is also possible for the keystone fix component or components generated by a party to be based on multiple keystone values created by the party—in other words, the keystone created by the party is a set of one or more values (as, in fact, already indicated in the generalized specification of the KGEN algorithm given above). Where the keystone comprises multiple values, these are used singly or in combination to form the required number of keystone fix components.

In the foregoing, the ambiguous signature of a party is by convention taken to include the the associated set R of keystone fix-related values. However, it will be appreciated that certain elements of the set R may already be public (for example, in the case of the FIG. 3 example, the element $(f_{A1} \oplus f_{A2})$ which is present in $R_C$ is already public through having been included in B's signature). Accordingly, it will not in all cases be necessary for a party to output all components of its set R so that the release of its signature becomes only a release of the unknown elements of its signature. Nevertheless, the release of only these unknown components still has the effect of releasing the signature as an operative whole.

It should be noted that a keystone can also be used to control when a single signature is rendered unambiguous—that is, it is not necessary for there to be an exchange of signatures. Thus a party A could produce an ambiguous signature using an ASIGN algorithm and make this signature available, with the signed data concerned, to other parties, party A then releasing the keystone at a time of its choosing to commit to its signature of the data. Of course, in such a situation there is no obvious alternate public key to use (that is, there is no obvious party to put as the potential alternate signer). Whilst a party could be chosen at random, an alternative approach is for the signing party simply to obtain a new, unbound, public/private key pair, use the public key of this key pair in ASIGN, and publish both the public and private keys of this new key pair. As a result, anyone could be responsible for generating an alternate signature using Alt-SIGN, this universal ambiguity only being removed when the signing party releases the keystone. Alternatively, a signer can pick a set of public keys each of which belongs to an independent entity, make a ring signature by using these public keys and his own private key, and later on release the keystone to prove the ring signature is actually signed by himself.

Finally, it may be noted that the keystone fix f and the related keystone k can be viewed as together forming a public/private key pair, with the private key k being released to remove ambiguity from signatures created using the public key f in the ASIGN signing process.

The invention claimed is:

1. A digital-signature method for simultaneously enabling signature verification of digitally-signed data exchanged between at least first and second parties that have associated respective public/private key-pairs; the method comprising:

(a) the first party operating a computing apparatus to perform the steps of: generating first cryptographic data, herein a keystone, and from this, second cryptographic data, herein a keystone fix;

generating a first signature in a first way using at least the keystone fix, the private key of the first-party's key-pair, the public key of at least one other public/private key-pair, and first subject data;

making available, at least to the second party, a first data set comprising the first subject data and the first signature including a first set of at least one keystone-fix-related element; and b) the second party operating a computing apparatus to perform the steps of: generating a second signature in said first way using at least one said keystone-fix-related element made available by the first party, the private key of the second party's key-pair, the public key of at least one other public/private key-pair, and second subject data;

making available, at least to the first party, a second data set comprising the second subject data and the second signature including a second set of at least one keystone-fix-related element;

each of the first and second signatures being such that an independent signature-checking party, without knowledge of the keystone, can only verify the signature as being one of a set of signatures comprising: a signature created in said first way, and a respective signature created in a second way by a possessor of the private key of the or each relevant said other key-pair; knowledge of the keystone being necessary for the signature-checking party to determine that the first and second signatures were created by the first and second parties respectively.

2. A method according to claim 1, wherein:
- the first party generates the keystone fix from the keystone by means of a one-way function;
- the said second way of creating a signature would, if implemented, generate an associated alternate keystone fix, and an alternate set of keystone-fix-related elements, from inputs to said second way rather than using an input keystone fix; and
- the signature-checking party requires a said set of at least one keystone-fix-related element to verify a said signature.

3. A method according to claim 2, further comprising the first party making the keystone available to the signature-checking party and the signature-checking party carrying out a verification process on a received data set that purports to come from one of the parties and comprise the signature of that party and subject data; the verification process comprising the following operations in any order:
- i) a determination of whether the or each element of said set of at least one keystone-fix-related element included in the signature of the received data set is derivable from the keystone, and
- ii) a verification operation for determining, on the basis of the received data set and the public keys of the first and said at least one other key-pairs, whether the signature in the data set is one of a set of signatures comprising: a signature created in said first way by said one party and a respective signature created in said second way by the possessor of the private key of the or each said other key-pair;
- positive determinations for both operations i) and ii) indicating that the signature in the data set is a signature created in said first way and was therefore created by the said one party on the subject data.

4. A method according to claim 2, wherein:
- the generation of the first signature by the first party uses the public key of only one said other public/private key-pair, and the generation of the second signature by the second party also uses the public key of only one said other public/private key-pair, and
- each of the first and second said sets of at least one keystone-fix-related element is constituted by the keystone fix.

5. A method according to claim 4, wherein the said public key used in the generation of the first signature is the public key of the second party, and wherein the second party, prior to making available the second signature, the second party carries out a verification process on a received data set that purports to come from the first party and to comprise the first signature and subject data; the verification process comprising the following operations in any order:
- i) a determination that the second party did not create the received data set itself; and
- ii) a verification operation for determining, on the basis of the received data set and the public keys of the first and second key-pairs, whether the signature in that data set is either one of: a signature created in said first way by the first party and a signature created in said second way by the second party;
- the second party only making available the second signature if both operations i) and ii) make positive determinations.

6. A method according to claim 4, further comprising the first party making the keystone available to the signature-checking party after receipt of the second signature whereby to simultaneously enable an independent signature-checking party to verify the first and second signatures unambiguously.

7. A method according to claim 6, wherein the said public key used in the generation of the second signature is the public key of the first party, and wherein the first party, prior to making available the keystone the first party carries out a verification process on a received data set that purports to come from the second party and to comprise the second signature and subject data; the verification process comprising the following operations in any order:
- i) a determination that the first party did not create the received data set itself; and
- ii) a verification operation for determining, on the basis of the received data set and the public keys of the second and first key-pairs, whether the signature in that data set is either one of: a signature created in said first way by the second party and a signature created in said second way by the first party;
- the first party only releasing the keystone if both operations i) and ii) result in positive determinations.

8. A method according to claim 6, wherein prior to making the keystone available, the first party carries out a verification process on a received data set that purports to come from the second party and to comprise the second party's signature, including a keystone fix, and subject data; the verification process comprising the following operations in any order:
- i) a determination of whether the keystone fix of the received data set is the same as the keystone fix generated by the first party from the keystone;
- ii) a verification operation for determining, on the basis of the received data set, the public key of the second party, and the other said public key used in generation of the second signature, whether the signature in that data set is either of: a signature created in said first way by the second party and a signature created in said second way by the possessor of the private key of the said other key-pair used in generation of the second signature;
- the first party only releasing the keystone if both operations i) and ii) result in positive determinations.

9. A method according to claim 6, further comprising the independent signature-checking party carrying out a verification process on first and second received data sets purporting to come from the first and second parties respectively and each comprising a said signature, including a keystone fix, and subject data; the verification process comprising the following operations, in any order:
- i) a determination of whether the keystone fixes of the first and second data sets are the same;
- ii) a determination of whether a said keystone fix is derivable from the keystone;
- iii) a verification operation for determining, on the basis of the first data set and the public keys of the first and said another key-pairs, whether the signature in the first data set is either of: a signature created in said first way by the first party and a signature created in said second way by the possessor of the private key of the relevant said other key-pair;
- iv) a verification operation for determining, on the basis of the second data set and the public keys of the second and said further key-pairs, whether the signature in the second data set is either one of a signature created in said first way by the second party and a signature created in said second way by the possessor of the private key of the relevant said other key-pair;
- positive determinations for all operations i) to iv) indicating that the exchange of signatures is valid.

10. A method according to claim 9, wherein the said public key used in the generation of the first signature is the public key of one of the second parties and the said public key used in the generation of each second signature is the public key of the first party.

11. A method according to claim 6, wherein the said public key used in the generation of the first signature is the public key of one of the second parties and the said public key used in the generation of each second signature is the public key of the first party.

12. A method according to claim 4, wherein:
each said key-pair is of the form:

$$X_i = g^{x_i} \bmod p$$

where: $X_i$ and $x_i$ are the public and private keys respectively of an ith party with i=1 herein for the key pair of the first party, $$x_i \in Z_q,$$

p and q are two large primes selected such that q|p−1, and g is an element of $(Z/pZ)^*$ of order q;

the first party chooses a random $k \in Z_q$ for the keystone and forms a keystone fix f by hashing the keystone k;

the first party (A) uses the keystone fix f together with its private key $x_1$, the public key $X_j$ of the said other key-pair and the subject data M, to create the first signature σ in said first way, as follows:

the first party chooses a random value t∈Zq,
the first party computes the values:

$$h = H_2(g^t X_j^f \| M)$$

$$w = h - f \bmod q$$

$$s = t - w x_1 \bmod q$$

said first signature σ being constituted by the quantities s, w and f.

13. A method according to claim 12, further comprising the first party making the keystone k available to the signature-checking party and the signature-checking party carrying out a verification process on a received data set that purports to come from the first party and to comprise said first signature σ and the subject data M; the verification process comprising the following operations in any order:

i) a determination of whether the keystone fix f is derivable from the keystone k, and ii) a verification operation for determining, on the basis of the received data set, the public key $X_1$ of the first party, and the public key $X_j$ of the said other key-pair, whether the signature in the data set is either of: signature created in said first way by the first party and a signature created in said second way by the possessor of the private key $x_j$ of the said other key-pair, this operation being effected as follows:

the signature-checking party computes:

$$h = f + w \bmod q$$

$$h' = H_2(g^s X_1^w X_j^f \| M)$$

the signature-checking party checks whether the equation:

$$h' = h$$

is satisfied;

positive determinations for both operations i) and ii) indicating that the signature in the signature set is a signature created in said first way and was therefore created by the first party on the subject data.

14. A method according to claim 4, wherein:
each said key-pair is of the form:

$$X_i = g^{x_i} \bmod p$$

where: $X_i$ and $x_i$ are the public and private keys respectively of an ith party with i=1 herein for the key pair of the first party, $$x_i \in Z_q,$$

p and q are two large primes selected such that q|p−1, and g is an element of $(Z/pZ)^*$ of order q;

the first party chooses a random $k \in Z_q$ for the keystone and forms components u and v of a keystone fix by hashing the keystone k in combination with first and second known quantities respectively;

the first party uses the components u and v together with its private key $x_1$, the public key $X_j$ of the said other key-pair and the subject data M, to create the first signature σ in said first way, as follows:

the first party chooses a random value t∈$Z_q$,
the first party computes the values:

$$w = g^u X_j^v \bmod p$$

$$h = H_2(g^t \| w \| M)$$

$$s = t - x1(h + u) \bmod q$$

said first signature σ being constituted by quantities h and s.

15. A method according to claim 14, further comprising the first party making the keystone k available to the signature-checking party and the signature-checking party carrying out a verification process on a received data set that purports to come from the first party and to comprise said first signature σ, the components u and v of the keystone fix, and the subject data M; the verification process comprising the following operations in any order:

i) a determination of whether the components u and v of the keystone fix are derivable from the keystone k, and ii) a verification operation for determining, on the basis of the received data set and the public keys $X_1$, $X_2$ of the first and said other key-pairs, whether the signature in the data set is either of: a signature created in said first way by the first party and a signature created in said second way by the possessor of the private key $x_j$ of the said other key-pair, this operation being effected as follows:

the signature-checking party computes:

$$(g^t)' = g^s X_1^{h+u} \bmod q$$

$$w' = g^u X_j^v \bmod p$$

$$h' = H_2((g^t)' \| w' \| M)$$

the signature-checking party checks whether the equation:

$$h' = h$$

is satisfied;

positive determinations for both operations i) and ii) indicating that the signature in the signature set is a signature created in said first way and was therefore created by the first party on the subject data.

16. A method according to claim 2, wherein said one-way function is a one-way hash function.

17. A method according to claim 2, wherein the first and second parties are respectively the first and second of a series of n parties each having a respective public/private key-pair; the $i^{th}$ party in said series:

at least where i<n, generating its own keystone and from this its own keystone fix, and generating, in its turn along said series from the first party, a signature in said first way using:

its own keystone fix, if any, the keystone fixes, or derivatives thereof, of the preceding (i−1) parties, if any, in said series, at least the private key of its own key-pair, and the public keys of the other parties;

the signature of the $i^{th}$ party including a set of at least one keystone-fix-related element, this set comprising at least one element formed by or from said keystone fixes involved in the generation of the signature, and the signature of the $i^{th}$ party requiring knowledge of the keystones of the first i parties in said series to be unambiguously verifiable whereby the first party can control, subject to the prior release of the keystones of the other parties, when all the signatures concurrently become unambiguously verifiable.

18. A method according to claim 17, further comprising the parties making available any keystone they have created with the first party only making available its keystone after having received the signature and keystone, if any, of each other party.

19. A method according to claim 18, further comprising the signature-checking party carrying out a verification process on received data sets each purporting to come from a respective one of said n parties and each comprising a said signature and subject data; the verification process comprising the following operations, in any order:

i) a determination of whether the elements of the respective set of at least one keystone-fix-related element included in the signature of each received data set, are derivable from the keystones;

ii) for each received data set, a verification operation for determining, on the basis of that data set and the public keys of the parties, whether the signature in the data set is either of: a signature created in said first way by the party associated with the data set and a signature created in said second way by one of the other parties;

positive determinations for all operations of i) to ii) indicating that the exchange of signatures is valid.

20. A method according to claim 17, wherein:

the keystone fix of the first party comprises (n−1) components and the keystone fix of each of at least the second to $(n-1)^{th}$ parties comprises one component;

in the generation of the signature of the $i^{th}$ party, the public key of each of the other parties in the series is given a respective exponent that is a respective member of a set comprising:

the, or one of the, keystone fix components, if any, of the $i^{th}$ party, and at least one keystone fix quantity comprising a component or combination of components of the keystone fixes of the preceding parties in said series, if any, all the keystone fix components of the first to $i^{th}$ parties being incorporated into said exponents used for the signature of the $i^{th}$ party and these exponents being included in the signature as said set of at least one keystone-fix-related element;

for each party, the exponents used for its public key in the signatures created by the other parties differ from each other.

21. A method according to claim 17, wherein:

the keystone fix of the $i^{th}$ party comprises (n−i) components, in the generation of the signature of the $i^{th}$ party, the public key of each of the other parties in the series is given a respective exponent that is a respective member of a set comprising:

the or each keystone fix component, if any, of the $i^{th}$ party, and a respective keystone fix quantity formed for each preceding party in the series by combining the components of its keystone fix using an exclusive OR function;

all the keystone fix components of the first to $i^{th}$ parties being incorporated into said exponents used for the signature of the $i^{th}$ party and these exponents being included in the signature as said set of at least one keystone-fix-related element;

the correspondence of set members to the public keys is moved round for each increment of i.

22. A method according to claim 17, wherein said one-way function is a one-way hash function.

23. A method according to claim 17, wherein at least one said signature is based on a Schnorr-type ring signature.

24. A method according to claim 17, wherein at least one said signature is based on an RSA-type ring signature.

25. A method according to claim 17, wherein at least one keystone comprises a set of two or more values.

26. A method according to claim 1, wherein the said public key used in the generation of the first signature is the public key of the second party.

27. A method according to claim 1, wherein the said public key used in the generation of the second signature is the public key of the first party.

28. A method according to claim 1, wherein the said public key used in the generation of the first signature is the public key of the second party and the said public key used in the generation of the second signature is the public key of the first party.

29. A method according to claim 1, wherein the said public key used in the generation of at least one of the first and second signatures is the public key of a further key-pair that is not one of the said key pairs of the first and second parties and that is made available beyond the party using it in signature generation and the signature-checking party.

30. A method according to claim 1, wherein there are multiple second parties each with its own respective public/private key-pair, the second parties using the same or different said other public/private key-pairs in generating their respective second signatures.

31. A method according to claim 30, wherein the said public key used in the generation of the first signature is the public key of one of the second parties.

32. A method according to claim 30, wherein the said public key used in the generation of each second signature is the public key of the first party.

33. A method according to claim 30, wherein the said public key used in the generation of the first signature is the public key of one of the second parties and the said public key used in the generation of each second signature is the public key of the first party.

34. A method according to claim 30, wherein the said public key used in the generation of at least one of the first and second signatures is the public key of a further key-pair that is not one of the said key pairs of the first and second parties and that is made available beyond the party using it in signature generation and the signature-checking party.

35. A method according to claim 1, wherein said signature is based on a Schnorr signature.

36. A method according to claim 1, wherein said signature is based on an RSA-type signature.

37. A method according to claim 1, wherein one signature is based on a Schnorr signature and the other is based on an RSA-type signature.

38. A concurrent-signature method for simultaneously enabling signature verification of digitally-signed data exchanged between first and second parties that have associated respective public/private key-pairs, the method comprising the steps of:
   a) the first party using a computing apparatus to perform operations including:
       generating a keystone and from this, a keystone fix;
       generating an ambiguous signature using the keystone fix, at least the private key of the first party's key-pair, the public key of the second party's key-pair, and first subject data;
       making available, at least to the second party, a first data set comprising the first subject data and the first-party's ambiguous signature including said keystone fix;
   b) the second party using a computing apparatus to perform operations including:
       generating an ambiguous signature using the keystone fix generated by the first party, at least the private key of the second party's key-pair, the public key of the first party's key-pair, and second subject data;
       making available, at least to the first party, a second data set comprising the second-party's ambiguous signature and the second subject data;
   c) the first party revealing the keystone to remove the ambiguity of the signatures so far as signature-checking parties are concerned.

39. A digital signature method wherein each of n parties with respective public/private key-pairs, creates in turn a signature based on:
   at least the private key of its own key-pair, —the public keys of the other parties,
   at least for the first n−1 signing parties, a keystone fix derived by a computing apparatus from a keystone created by the party concerned, and
   the keystone fixes of the preceding (i−1) signing parties, if any;
the signature of the $i^{th}$ party requiring knowledge of the keystones of the first i parties in said series to remove its ambiguity whereby the first signing party can control, subject to the prior release of the keystones of the other parties, when all the signatures concurrently become unambiguously verifiable by an independent party.

* * * * *